United States Patent [19]
Iriyama

[11] Patent Number: 4,892,074
[45] Date of Patent: Jan. 9, 1990

[54] SPARK IGNITION TIMING CONTROL SYSTEM FOR INTERNAL COMBUSTION ENGINE

[75] Inventor: Masahiro Iriyama, Kanagawa, Japan

[73] Assignee: Nissan Motor Company, Limited, Yokohama, Japan

[21] Appl. No.: 212,489

[22] Filed: Jun. 28, 1988

[30] Foreign Application Priority Data

Jun. 29, 1987 [JP] Japan ............................ 62-100743[U]

[51] Int. Cl.$^4$ ................................. F02P 5/12
[52] U.S. Cl. ..................................... 123/425
[58] Field of Search ................................ 123/425, 435

[56] References Cited

U.S. PATENT DOCUMENTS

| | | | |
|---|---|---|---|
| 4,356,551 | 10/1982 | Iwase et al. | 123/425 X |
| 4,612,902 | 9/1986 | Abe et al. | 123/425 |
| 4,660,535 | 4/1987 | Asano | 123/425 |
| 4,690,116 | 9/1987 | Takahaski | 123/425 |

FOREIGN PATENT DOCUMENTS 39974 3/1984 Japan .

Primary Examiner—Tony M. Argenbright
Attorney, Agent, or Firm—Foley & Lardner, Schwartz, Jeffery, Schwaab, Mack, Blumenthal & Evans

[57] ABSTRACT

A spark ignition timing control system includes pressure sensors monitoring internal pressure in respectively associated combustion chambers. The outputs of the pressure sensors are processed for detecting crank shaft angular position at which the internal pressures in respective combustion chambers become maximum. Angular difference of the crank angular maximum pressure positions at which the internal pressures of the combustion chambers become maximum, with target angular positions for deriving are derived. The present invention features that correction value for correcting a basic spark advance for each engine cylinder is composed of first and second components. The first component is derived on the basis of the angular difference value derived with respect to the maximum pressure position of the corresponding engine cylinder. On the other hand, the second component is derived on the basis of the angular difference values derived with respect to the maximum pressure positions of other cylinders.

11 Claims, 5 Drawing Sheets 4,892,074

SPARK IGNITION TIMING CONTROL SYSTEM FOR INTERNAL COMBUSTION ENGINE

BACKGROUND OF THE INVENTION

1. Field of the Invention

The present invention relates generally to a spark ignition timing control system for an internal combustion engine, such as an automotive internal combustion engine. More specifically, the invention relates to a spark ignition timing control system for minimum advance for best torque (MBT) control.

2. Description of Background Art

In order to obtain optimum engine performance, it is essential to control a spark ignition timing appropriately. For this purpose, known MBT control is performed for obtaining maximum torque with minimum advance of spark advance angle for better fuel economy. In the known MBT control, FEEDBACK control is performed for reducing a difference between a timing where a maximum pressure in an engine cylinder is obtained and a preset target timing representative optimal timing to obtain better engine output. In such case, fluctuation of maximum pressure in the engine cylinder due to various unstable combustioning factors, tends to be fed back to cause fluctuation of the spark ignition timing to be derived based thereon. This tendency becomes higher when feedback loop gain is increased for improving response characteristics of spark ignition timing control.

In order to avoid such drawback, Japanese Patent First (unexamined) Publication (Tokkai) Showa 59-39974 proposes MBT control which utilizes an average value over a predetermined cycles of engine revolution as a timing of maximum pressure in the combustion chamber. Therefore, in the disclosed system, spark ignition timing is adjusted so that the timing to obtain the maximum pressure in the combustion chamber as represented by the average value toward the target timing. This system is successfully in providing stability in spark ignition timing control. However, on the other hand, this system clearly degrade response characteristics in transition.

SUMMARY OF THE INVENTION

Therefore, it is an object of the invention to provide a spark ignition timing control system which can provide satisfactory stability in spark ignition timing control without degrading response characteristics in transition state.

In order to accomplish the aforementioned and other objects, a spark ignition timing control system, according to the present invention, includes pressure sensors monitoring internal pressure in respectively associated combustion chambers. The outputs of the pressure sensors are processed for detecting crank shaft angular position at which the internal pressures in respective combustion chambers become maximum. Angular difference of the crank angular maximum pressure positions at which the internal pressures of the combustion chambers become maximum, with target angular positions for deriving are derived. The present invention features that correction value for correcting a basic spark advance for each engine cylinder is composed of first and second components. The first component is derived on the basis of the angular difference value derived with respect to the maximum pressure position of the corresponding engine cylinder. On the other hand, the second component is derived on the basis of the angular difference values derived with respect to the maximum pressure positions of other cylinders.

Utilizing of the second component for correcting the basic spark advance, influence of cycle-to-cycle fluctuation of engine combustioning condition due to various unstability factors can be eliminated or requested. This allows stable spark ignition timing control. In other words, this allows higher feedback gain to be used in derivation of the correction value based on the angular difference for better response characteristics in transition. According one aspect of the invention, a spark ignition timing control system for an internal combustion engine having a plurality of engine cylinders, comprises a first sensor for monitoring an engine revolution speed to produce an engine speed indicative first sensor signal, a second sensor for monitoring load condition on the engine to produce an engine load indicative second sensor signal, a third sensor, disposed in a first engine cylinder, for detecting first maximum pressure timing at which the internal pressure in a first combustion chamber thereof is obtained, the third sensor producing a third sensor signal indicative of the first maximum pressure timing, a fourth sensor, disposed in a second engine cylinder, for detecting a second maximum pressure timing at which the internal pressure in a second combustion chamber thereof is obtained, the fourth sensor producing a fourth sensor signal indicative of the second maximum pressure timing, fifth means for deriving a basic spark advance on the basis of the first and second sensor signal values, sixth means for deriving a first error data representative of a difference between the first maximum pressure timing and a predetermined reference timing and a second error data representative of a difference between the second maximum pressure timing and the reference timing, and seventh means for deriving a correction value for the basic spark advance of the first engine cylinder, the correction value being constituted of a first component derived on the basis of the first error value and a second component derived on the basis of the second error value, and the seventh means correcting the basic spark advance of the first engine cylinder with the correction value.

The seventh means may derive the first component of the correction value by multiplying the first error data by a predetermined first feedback coefficient and the second component by multiplying the second error data by a predetermined second feedback coefficient which is smaller than the first feedback coefficient.

Preferably, the spark timing control system further comprises a eighth sensor, disposed in a third engine cylinder, for detecting a third maximum pressure timing at which the internal pressure in a third combustion chamber thereof is obtained, the fourth sensor producing a fourth sensor signal indicative of the third maximum pressure timing, the fifth means further derives a third error value between the third maximum pressure timing and the reference timing, and the seventh means derives the second component of the correction value on the basis of the second and third error data. In this case, the seventh means derives the first component of the correction value by multiplying the first error data by a predetermined first feedback coefficient and the second component by multiplying a sum value of the second and third error data by a predetermined second feedback coefficient which is smaller than the first feedback coefficient. In practice, the seventh means derives the correction value as a sum of the first and second components.

According to another aspect of the invention, a spark ignition timing control system for an internal combustion engine having a plurality of engine cylinders, comprises a crank angle sensor for producing a crank position signal at every given angular displacement of an engine crank shaft and a crank reference signal at a every predetermined reference angular positions of the crank shaft, an intake air flow rate sensor for monitoring an intake air flow rate to produce an intake air flow rate indicative sensor signal, a first pressure sensor, disposed in a first engine cylinder, for monitoring an internal pressure in a first combustion chamber thereof to produce a first pressure indicative signal, a second sensor, disposed in a second engine cylinder, for monitoring an internal pressure in a second combustion chamber thereof to produce a second pressure indicative signal, an engine speed derivation means for deriving engine speed data on the basis of intervals of one of the crank position signal and the crank reference signal, a basic spark advance deriving means for deriving a basic spark advance indicative data on the basis of the air flow rate indicative signal value and the engine speed data, a first timing detector means, receiving the first pressure signal, the crank reference signal and the crank position signal, for monitoring variation of the first pressure signal value relative to the crank shaft angular position derived by counting the crank position signal from occurrence of the crank reference signal representing a first crank shaft reference position at a given angle before the top-dead center of the first engine cylinder, the first timing detector means detecting a first crank shaft maximum pressure position where the first pressure signal value becomes maximum to produce a first timing signal representative thereof, a second timing detector means, receiving the second pressure signal, the crank reference signal and the crank position signal, for monitoring variation of the second pressure signal value relative to the crank shaft angular position derived by counting the crank position signal from occurrence of the crank reference signal representing a second crank shaft reference position at a given angle before the top-dead center of the second engine cylinder, the second timing detector means detecting a second crank shaft maximum pressure position where the second pressure signal value becomes maximum to produce a second timing signal representative thereof, a first error derivation means for deriving a first error data representative of a difference between the first first crank shaft maximum pressure position and a predetermined target position toward which the first crank shaft maximum pressure position is to be adjusted, to produce a first error indicative signal, a second error derivation means for deriving a second error data representative of a difference between the second second crank shaft maximum pressure position and a predetermined target position toward which the second crank shaft maximum pressure position is to be adjusted, to produce a second error indicative signal, a correction means for deriving a correction value for the basic spark advance of the first engine cylinder, the correction value being constituted of a first component derived on the basis of the first error value and a second component derived on the basis of the second error value, and the seventh means correcting the basic spark advance of the first engine cylinder with the correction value.

In the practical operation, the correction means derives the first component of the correction value by amplifying the first error indicative signal with a predetermined first feedback gain and the second component by amplifying the second error indicative signal by a predetermined second feedback gain which is smaller than the first feedback gain.

On the other hand, a spark ignition timing control system further comprises a third sensor, disposed in a third engine cylinder, for monitoring an internal pressure in a third combustion chamber thereof to produce a third pressure indicative signal, a third timing detector means, receiving the third pressure signal, the crank reference signal and the crank position signal, for monitoring variation of the third pressure signal value relative to the crank shaft angular position derived by counting the crank position signal from occurrence of the crank reference signal representing a third crank shaft reference position at a given angle before the top-dead center of the third engine cylinder, the third timing detector means detecting a third crank shaft maximum pressure position where the third pressure signal value becomes maximum to produce a third timing signal representative thereof, and a third error derivation means for deriving a third error data representative of a difference between the third third crank shaft maximum pressure position and a predetermined target position toward which the third crank shaft maximum pressure position is to be adjusted, to produce a third error indicative signal, and the correction means derives the second component on the basis of a sum value of the second and third error indicative signal values.

DESCRIPTION OF THE PREFERRED EMBODIMENT

Figure 1:
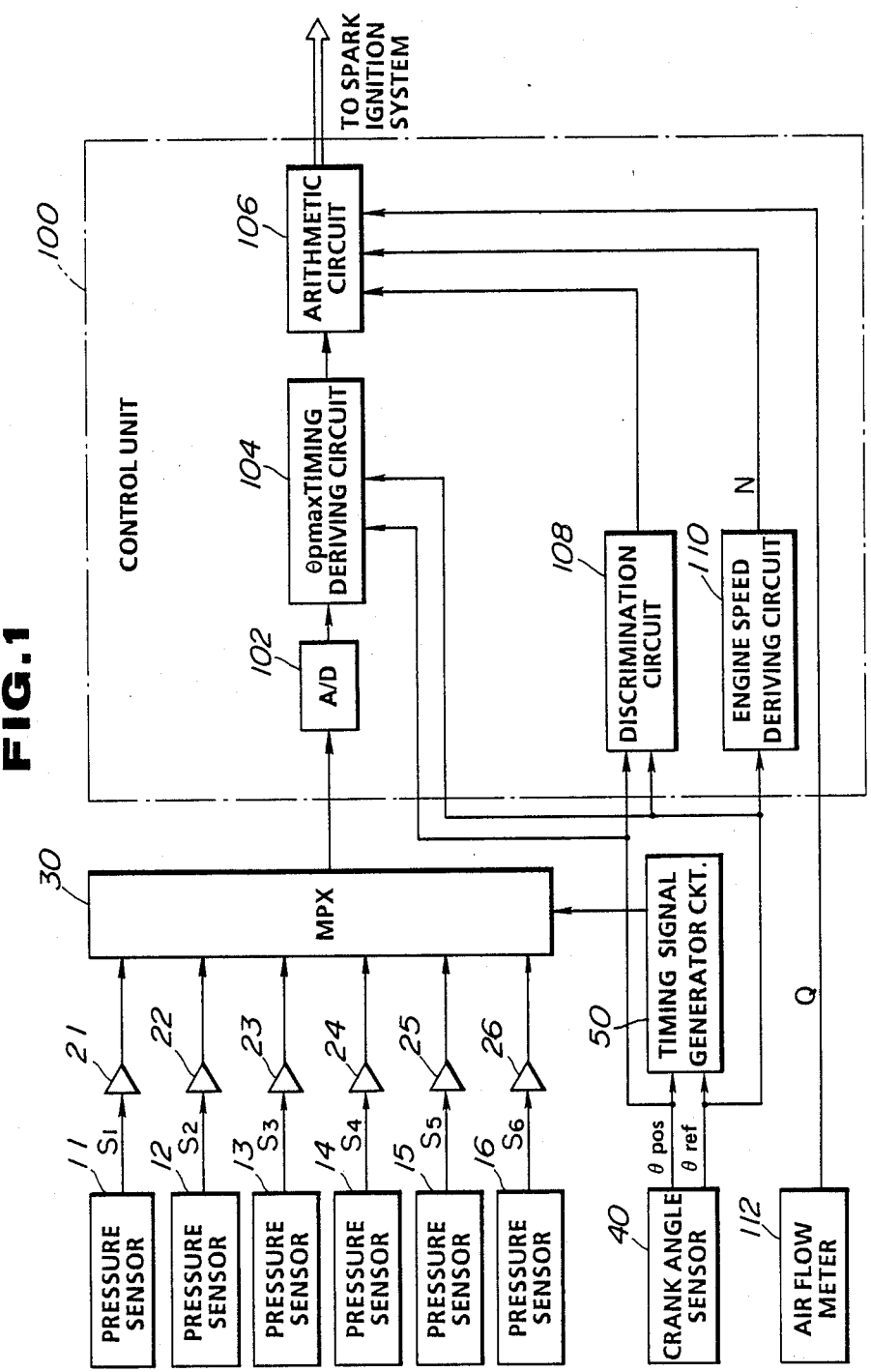
FIG. 1 is a block diagram of the preferred embodiment of a spark ignition timing control system according to the present invention.

Referring now to the drawings, particularly to FIG. 1, the preferred embodiment of a spark ignition timing control system is illustrated without non-essential components which may be included in the actual system for simplification of the disclosure and for facilitating clear understanding of the invention. Namely, though the preferred embodiment of the spark ignition timing control system of FIG. 1 may perform correction of spark ignition timing on the basis of various correction factors, such as engine coolant temperature condition, engine knocking magnitude and so forth as that performed in the known systems, the components necessary for such spark ignition timing correction are neglected from the system illustrated in FIG. 1. However, it should be appreciated that the idea of the spark ignition timing control in the preferred embodiment of the spark ignition timing control system according to the present invention is applicable for any type of the spark ignition control system.

In FIG. 1, a control unit 100 is connected to a plurality of pressure sensors 11, 12, 13, 14, 15 and 16 which are disposed in respectively associated engine cylinders (not shown) for monitoring internal pressure in combustion chambers thereof. The pressure sensors 11, 12, 13, 14, 15 produces combustion chamber internal pressure indicative sensor signal $S_1$, $S_2$, $S_3$, $S_4$, $S_5$ and $S_6$. These combustion chamber internal pressure indicative sensor signals $S_1$, $S_2$, $S_3$, $S_4$, $S_5$ and $S_6$ are fed to the control unit 100 via amplifiers 21, 22, 23, 24, 25 and 26 and a multiplexer 30. The amplifiers 21, 22, 23, 24, 25 and 26 comprise charge amplifiers which convert charge signal produced by the pressure sensors 11, 12, 13, 14, 15 and 16 into voltage signals $S_{11}$, $S_{12}$, $S_{13}$, $S_{14}$, $S_{15}$ and $S_{16}$. The multiplexer 30 selectively inputs the voltage signals $S_{11}$, $S_{12}$, $S_{13}$, $S_{14}$, $S_{15}$ and $S_{16}$ to the control unit.

The control unit 100 is also connected to a crank angle sensor 40 to receive a crank reference signal $\theta_{ref}$ which is generated at every predetermined crank shaft angular position, and a crank position signal $\theta_{pos}$ which is generated at every predetermined angle of angular displacement of the crank shaft. In practice, the crank reference signal $\theta_{ref}$ is produced every 120° or 180° crank shaft positions which corresponding to given angle, e.g. 70° before top-dead-center (TDC) of each engine cylinder. On the other hand, the crank position signal $\theta_{pos}$ is generated every 1° of engine crank shaft revolution. Furthermore, in order to enable to discriminate combustioning cylinder number, the pulse width of the crank reference signal $\theta_{ref}$ to be produced with respect to No. 1 cylinder is differentiated from that of other cylinders.

The crank angle sensor 40 is also connected to a timing signal generator circuit 50. The timing signal generator 50 is responsive to every crank reference signal $\theta_{ref}$ to output timing signal to the multiplexer 30 to cause switching of connection between the pressure sensors 11, 12, 13, 14, 15 and 16 and the control unit 100. In practice, the multiplexer 30 is switched to input the combustion chamber internal pressure indicative sensor signal in order of $S_1$, $S_5$, $S_3$, $S_6$, $S_2$ and $S_4$.

The control unit 100 has an analog-to-digital (A/D) converter 102 for converting the analog form input signal from the multiplexer 30 into digital signal. The A/D converter 102 is connected to a maximum pressure timing deriving circuit 104 which derives crank angle position at which maximum pressure in the combustion chamber is obtained. The crank angle position where the maximum pressure in the combustion chamber is obtained, will be hereafter referred to as "maximum pressure position $\theta_{pmax}$". The maximum pressure timing deriving circuit 104 thus generates a maximum pressure position data which will be hereafter referred to as "$\theta_{pmax}$ data". In practice, the maximum pressure timing deriving circuit 104 detects the maximum pressure. Simultaneously, the maximum pressure timing deriving circuit 104 counts the crank position signal $\theta_{pos}$. The crank position signal $\theta_{pos}$ count is latched when the maximum pressure in the combustion chamber is detected. The latched crank position signal $\theta_{pos}$ count serves as the $\theta_{pmax}$. The $\theta_{pmax}$ data of the maximum pressure timing deriving circuit 104 is fed to an arithmetic circuit 106.

The control unit 100 also has a cylinder discrimination circuit 108. The discrimination circuit 108 receives the crank reference signals $\theta_{ref}$ and compares the pulse width of the received crank reference signals with that of a reference pulse which represents the pulse width of the crank reference signal of the No. 1 cylinder. The discrimination circuit 108 counts the crank reference signals $\theta_{ref}$ and resets the counted value when the crank reference signal having a pulse width coincidence with that of the reference pulse is detected. Since order of performing spark ignition in the cylinders is No. 1—No. 5—No. 3—No. 6—No. 2 No.—No. 4. Therefore, the combustioning cylinder number and the counted value may be related as shown in the following table:

| counted value | cylinder No. |
|---|---|
| 0 | No. 1 |
| 1 | No. 5 |
| 2 | No. 3 |
| 3 | No. 6 |
| 4 | No. 2 |
| 5 | No. 4 |

The discrimination circuit 108 thus generates a combustioning cylinder number data to be fed to the arithmetic circuit 106.

The control unit 100 also has an engine speed deriving circuit 110 counting the crank reference signals $\theta_{ref}$ and measures the interval of occurrences of the consecutive crank reference signal to derive the engine speed by obtaining reciprocal of the interval. The engine speed deriving circuit 110 thus generates an engine speed data to be input to the arithmetic circuit 106. The control unit 100 is further connected to an air flow meter 112 which monitors air flow rate in an air induction system to produce an air flow rate indicative signal.

Figure 2:
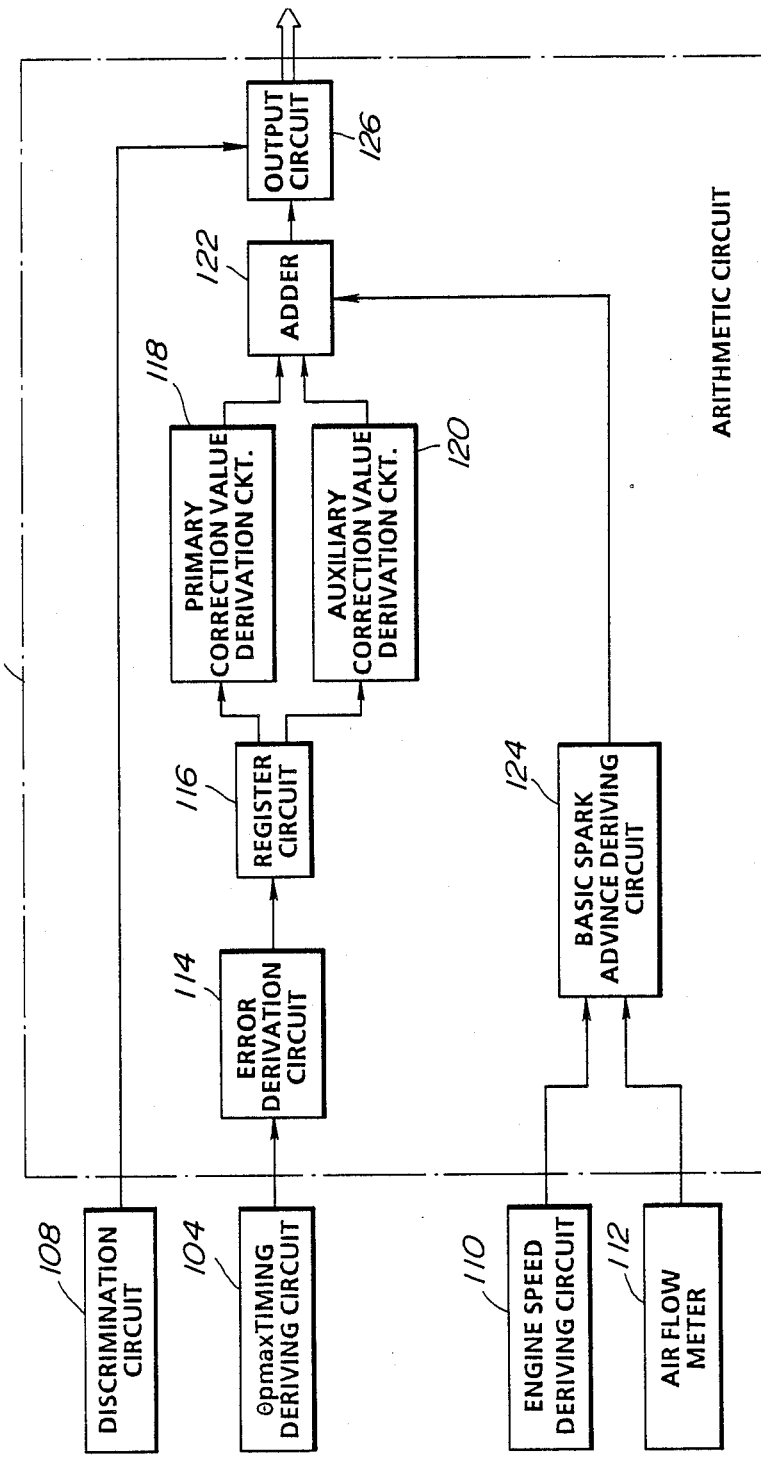
FIG. 2 is a block diagram showing detailed circuit construction of an arithmetic circuit in the preferred embodiment of the spark ignition control system of FIG. 1.

As shown in FIG. 2, the arithmetic circuit 106 comprises an error derivation circuit 114 connected to the maximum pressure timing deriving circuit 104. The error derivation circuit 114 receives the $\theta_{pmax}$ data from the maximum pressure timing deriving circuit 104 with a predetermined target position data $\theta_{target}$ to obtain an error data $\theta_{error}$. The error data $\theta_{error}$ is fed to a register circuit 116 which has a plurality of memory blocks for storing the error data $\theta_{error}$ with respect to respective engine cylinders. The register circuit 116 also receives the combustioning cylinder data of the discrimination circuit 108. The register circuit 116 utilizes the combustioning cylinder number data as address signal for storing the error data $\theta_{error}$ in one of the memory locks identified by the combustioning cylinder number.

The register circuit 116 is, on the other hand, accessed by the combustioning cylinder number data to read out the error data $\theta_{error}$ of the corresponding engine cylinder and feed to a primary correction value derivation circuit 118. On the other hand, the register circuit 116 reads out the error data $\theta_{error}$ of other engine cylinders to feed to an auxiliary correction value derivation circuit 120. The primary correction value derivation circuit 118 derives a primary correction value based on the input error data $\theta_{error}$ with a main feedback gain. On the other hand, the auxiliary correction value derivation circuit 120 derives a sum of the error data $\theta_{error}$ of the engine cylinders other than the cylinder identified by the combustioning cylinder number data and multiplies the sum value with a sub-feedback gain which is smaller than the main feedback gain, to derive the auxiliary correction value. The primary and auxiliary correction values of the primary and auxiliary correction value derivation circuits 118 and 120 are fed to an adder 122.

On the other hand, the arithmetic circuit 106 has a basic park ignition timing derivation circuit 124. The basic spark ignition timing derivation circuit 124 is connected to the engine speed indicative value derivation circuit 110 and the air flow meter 112. The basic spark ignition timing derivation circuit 124 performs table look-up utilizing a three-dimensional table of FIG. 3 to derive the basic spark ignition timing. Thus, the basic spark ignition timing derivation circuit 124 generates a basic spark ignition timing data and feeds the same to the adder 122. The basic spark ignition timing data is modified with the primary and auxiliary correction values.

The control unit 100 further has a timing control circuit 126 which controls output timing of the spark ignition signal to an ignition system 128. The timing control circuit 126 receives the combustioning cylinder number data for feeding the spark ignition timing signal at a timing determined based on the spark ignition timing data.

Figure 4:
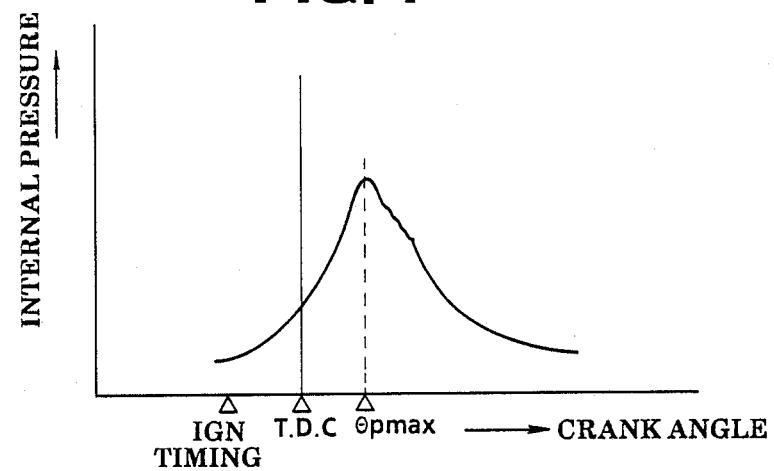
FIG. 4 is a graph showing variation of pressure in an engine combustion chamber relative to spark ignition timing.
Figure 5:
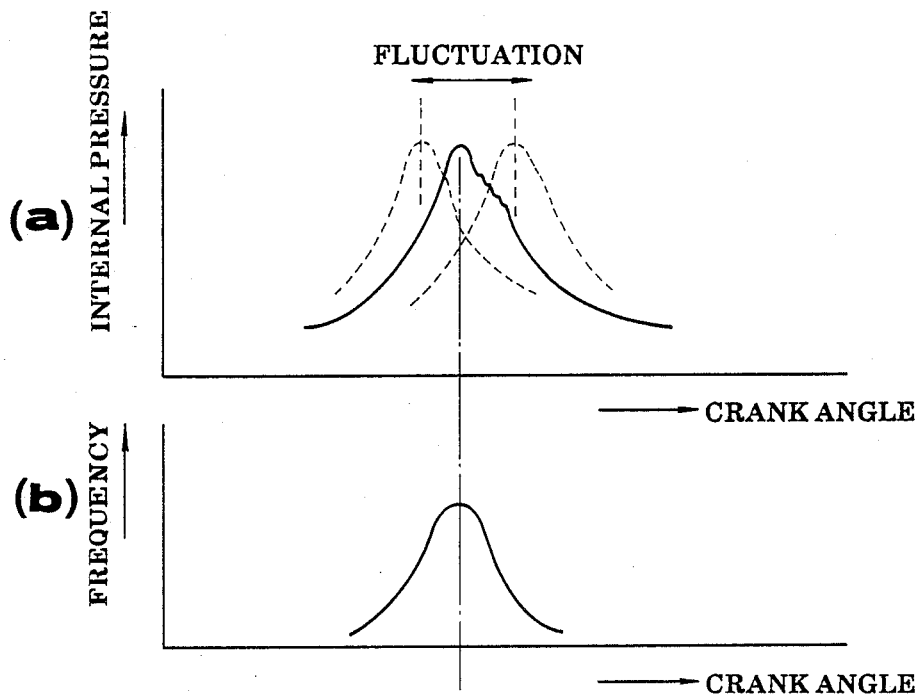
FIGS. 5A and 5B are graphs showing fluctuation of timing where maximum pressure in the engine combustion engine is obtained and fluctuation frequency.

FIG. 4 shows ideal spark ignition pattern in which the $\theta_{pmax}$ position substantially coincides with the target position. Since the output torque of the engine becomes maximum when the maximum pressure is obtained at the target position, the shown pattern provides optimal engine performance. However, in the practical spark ignition timing control, the $\theta_{pmax}$ position tends to fluctuates by the influence of engine driving unstability factors, as shown in FIG. 5A. When this fluctuating $\theta_{pmax}$ data is directly utilized as feedback parameter for MBT control, the spark ignition timing tends to be fluctuate to cause unstability on the engine. The illustrated embodiment successfully suppresses the fluctuation due to fluctuation of the $\theta_{pmax}$ position by employing the auxiliary correction value derived with respect to the $\theta_{pmax}$ positions of other cylinders.

Namely, variation of spark advance angle in response to engine output demand is uniform in respective cylinders. On the other hand, the unstability factors tends to influence to each cylinder and in each engine revolution cycle independently of the other. Therefore, by providing the auxiliary correction value derived based on $\theta_{pmax}$ positions of other cylinders, influence of the fluctuation of the $\theta_{pmax}$ position due to the influence of the unstability factors can be made small enough to maintain engine driving stability at an acceptable level.

Figure 6:
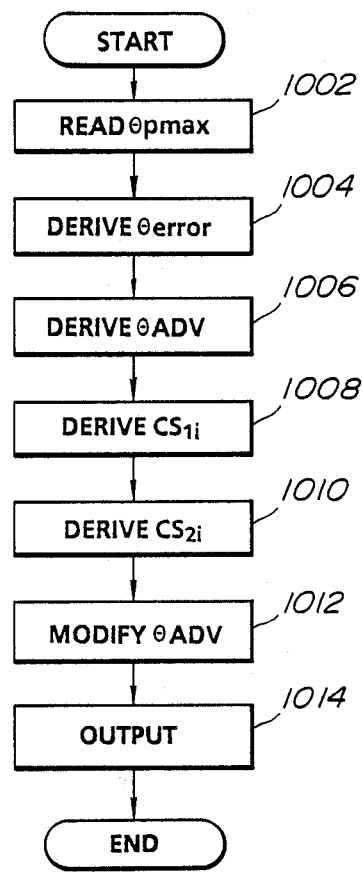
FIG. 6 is a flowchart of spark ignition timing control program.

FIG. 6 shows a flowchart of a spark ignition control program to be executed by the control unit 100 in the practical operation.

Immediately after execution, the $\theta_{pmax}$ data of the combustioning cylinder is read at a step 1002. The read $\theta_{pmax}$ data is compared with a target position data $\theta_{target}$ to derive the error data $\theta_{error}$ at a step 1004. In practice, the error data $\theta_{error}$ is derived by the following equation:

$$\theta_{error} = \theta_{target} - \theta_{pmax}$$

The error data $\theta_{error}$ derived at the step 1004 is stored in the corresponding memory block of the register circuit 116.

Figure 3:
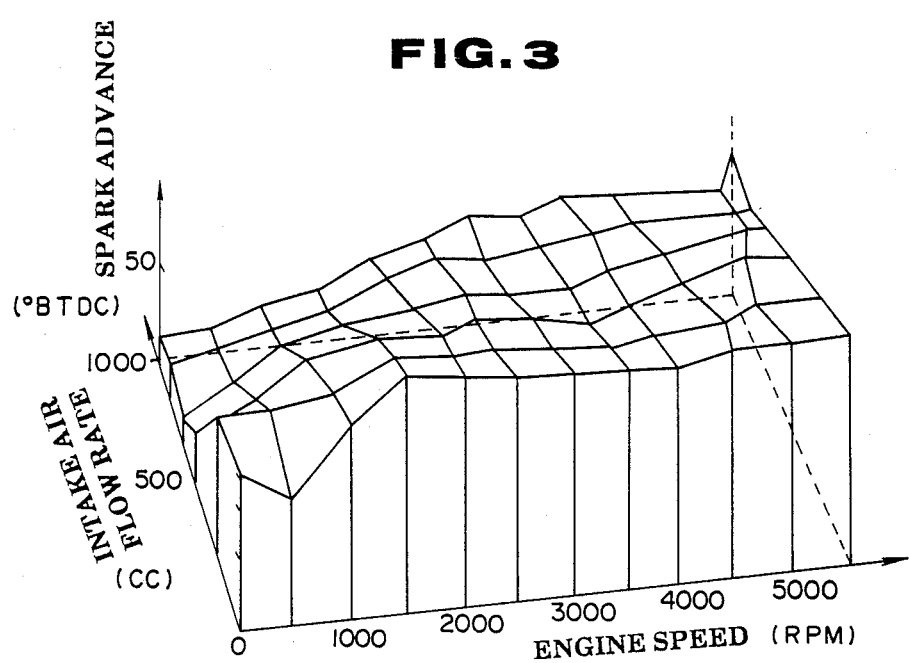
FIG. 3 is a three-dimensional table to be utilized for deriving basic spark ignition timing.

At a step 1006, the engine speed data N and the intake air flow rate indicative data Q are read out. In terms of the engine speed data N and the intake air flow rate data Q, table look-up against the three-dimensional table of FIG. 3 is performed for deriving a basic spark advance data $\theta_{ADV}$.

At a step 1008, the primary correction value $CS_{1i}$ is derived based on the error data $\theta_{error}$ of the combustioning cylinder as accessed by the combustioning cylinder number data of the discrimination circuit 108 and a main feedback gain K. In the practical operation, the primary correction value $CS_{1i}$ is derived by the following equation:

$$CS_{1i} = CS_{1i}' + K \times \theta_{error}$$

where $CS_{1i}'$ is a primary correction value derived in preceding calculation cycle.

On the other hand, the auxiliary correction value $CS_{2i}$ is derived based on the sum value of the error values $\theta_{error}$ of other cylinders and sub-feedback gain K/N at a step 1010. Assuming the sum value of the error values $\theta_{error}$ of other cylinders is $\theta_{sum}$, the auxiliary correction value $CS_{2i}$ can be derived by the following equation:

$$CS_{2i} = CS_{2i}' + K/N \times \theta_{sum}$$

where $CS_{2i}'$ is a primary correction value derived in preceding calculation cycle; and N is greater than 1.

Based on the primary and auxiliary correction values $CS_{1i}$ and $CS_{2i}$ derived at the steps 1008 and 1010, the basic spark advance data $\theta_{AVD}$ is modified at a step 1012. Thereafter, at a timing where the crank shaft angular position reaches the spark advance angle represented by the basic spark advance data $\theta_{AVD}$, a trigger signal $S_{sp}$ is output to initiate spark ignition in the combustioning engine cylinder.

As will be appreciated herefrom, the preferred embodiment of the spark ignition timing control system according to the invention fulfills all of the objects and advantages sought therefor.

What is claimed is:

1. A spark ignition timing control system for an internal combustion engine having a plurality of engine cylinders, comprising:

a first sensor for monitoring an engine revolution speed to produce an engine speed indicative first sensor signal;

a second sensor for monitoring load condition on the engine to produce an engine load indicative second sensor signal;

a third sensor, disposed in a first engine cylinder, for detecting first maximum pressure timing at which the internal pressure in a first combustion chamber thereof is obtained, said third sensor producing a third sensor signal indicative of said first maximum pressure timing;

a fourth sensor, disposed in a second engine cylinder, for detecting a second maximum pressure timing at which the internal pressure in a second combustion chamber thereof is obtained, said fourth sensor producing a fourth sensor signal indicative of said second maximum pressure timing;

fifth means for deriving a basic spark advance on the basis of said first and second sensor signal values;

sixth means for deriving a first error data representative of a difference between said first maximum pressure timing and a predetermined reference timing and a second error data representative of a difference between said second maximum pressure timing and said reference timing;

seventh means for deriving a correction value for said basic spark advance of said first engine cylinder, said correction value being constituted of a first component derived on the basis of said first error value and a second component derived on the basis of said second error value, and said seventh means correcting said basic spark advance of said first engine cylinder with said correction value.

2. A spark ignition timing control system as set forth in claim 1, wherein said seventh means derives said first component of said correction value by multiplying said first error data by a predetermined first feedback coefficient and said second component by multiplying said second error data by a predetermined second feedback coefficient which is smaller than said first feedback coefficient.

3. A spark ignition timing control system as set forth in claim 1, which further comprises an eighth sensor, disposed in a third engine cylinder, for detecting a third maximum pressure timing at which the internal pressure in a third combustion chamber thereof is obtained, said fourth sensor producing a fourth sensor signal indicative of said third maximum pressure timing, said fifth means further derives a third error value between said third maximum pressure timing and said reference timing, and said seventh means derives said second component of said correction value on the basis of said second and third error data.

4. A spark ignition timing control system as set forth in claim 3, wherein said seventh means derives said first component of said correction value by multiplying said first error data by a predetermined first feedback coefficient and said second component by multiplying a sum value of said second and third error data by a predetermined second feedback coefficient which is smaller than said first feedback coefficient.

5. A spark ignition timing control system as set forth in claim 4, wherein said seventh means derives said correction value as a sum of said first and second components.

6. A spark ignition timing control system for an internal combustion engine having a plurality of engine cylinders, comprising:

a crank angle sensor for producing a crank position signal at every given angular displacement of an engine crank shaft and a crank reference signal at a every predetermined reference angular positions of said crank shaft;

an intake air flow rate sensor for monitoring an intake air flow rate to produce an intake air flow rate indicative sensor signal;

a first pressure sensor, disposed in a first engine cylinder, for monitoring an internal pressure in a first combustion chamber thereof to produce a first pressure indicative signal;

a second sensor, disposed in a second engine cylinder, for monitoring an internal pressure in a second combustion chamber thereof to produce a second pressure indicative signal;

an engine speed derivation means for deriving engine speed data on the basis of intervals of one of said crank position signal and said crank reference signal;

a basic spark advance deriving means for deriving a basic spark advance indicative data on the basis of said air flow rate indicative signal value and said engine speed data;

a first timing detector means, receiving said first pressure signal, said crank reference signal and said crank position signal, for monitoring variation of said first pressure signal value relative to the crank shaft angular position derived by counting said crank position signal from occurrence of said crank reference signal representing a first crank shaft reference position at a given angle before the top-dead center of said first engine cylinder, said first timing detector means detecting a first crank shaft maximum pressure position where said first pressure signal value becomes maximum to produce a first timing signal representative thereof;

a second timing detector means, receiving said second pressure signal, said crank reference signal and said crank position signal, for monitoring variation of said second pressure signal value relative to the crank shaft angular position derived by counting said crank position signal from occurrence of said crank reference signal representing a second crank shaft reference position at a given angle before the top-dead center of said second engine cylinder, said second timing detector means detecting a second crank shaft maximum pressure position where said second pressure signal value becomes maximum to produce a second timing signal representative thereof;

a first error derivation means for deriving a first error data representative of a difference between said first first crank shaft maximum pressure position and a predetermined target position toward which said first crank shaft maximum pressure position is to be adjusted, to produce a first error indicative signal;

a second error derivation means for deriving a second error data representative of a difference between said second crank shaft maximum pressure position and a predetermined target position toward which said second crank shaft maximum pressure position is to be adjusted, to produce a second error indicative signal;

a correction means for deriving a correction value for said basic spark advance of said first engine cylinder, said correction value being constituted of a first component derived on the basis of said first error value and a second component derived on the basis of said second error value, and said correction means correcting said basic spark advance of said first engine cylinder with said correction value.

7. A spark ignition timing control system as set forth in claim 6, wherein said correction means derives said first component of said correction value by multiplying said first error indicative signal with a predetermined first feedback coefficient and said second component by multiplying said second error indicative signal by a predetermined second feedback coefficient which is smaller than said first feedback coefficient.

8. A spark ignition timing control system as set forth in claim 6, wherein said correction means derives said first component of said correction value by amplifying said first error indicative signal with a predetermined first feedback gain and said second component by amplifying said second error indicative signal by a predetermined second feedback gain which is smaller than said first feedback gain.

9. A spark ignition timing control system as set forth in claim 6, which further comprises a third sensor, disposed in a third engine cylinder, for monitoring an internal pressure in a third combustion chamber thereof to produce a third pressure indicative signal, a third timing detector means, receiving said third pressure signal, said crank reference signal and said crank position signal, for monitoring variation of said third pressure signal value relative to the crank shaft angular position derived by counting said crank position signal from occurrence of said crank reference signal representing a third crank shaft reference position at a given angle before the top-dead center of said third engine cylinder, said third timing detector means detecting a third crank shaft maximum pressure position where said third pressure signal value becomes maximum to produce a third timing signal representative thereof, and a third error derivation means for deriving a third error data representative of a difference between said third crank shaft maximum pressure position and a predetermined target position toward which said third crank shaft maximum pressure position is to be adjusted, to produce a third error indicative signal, and said correction means derives said second component on the basis of a sum value of said second and third error indicative signal values.

10. A spark ignition timing control system as set forth in claim 9, wherein said correction means derives said first component of said correction value by multiplying said first error signal value by a predetermined first feedback coefficient and said second component by multiplying a sum value of said second and third error signal values by a predetermined second feedback coefficient which is smaller than said first feedback coefficient.

11. A spark ignition timing control system as set forth in claim 10, wherein said correction means derives said correction value as a sum of said first and second components.

* * * * *